United States Patent
Vdovine et al.

(10) Patent No.: US 8,530,100 B2
(45) Date of Patent: Sep. 10, 2013

(54) METHOD OF CHEMICAL TREATMENT OF FUEL CELL PLATE SURFACE TO MODIFY WETTABILITY OF FLOW FIELD CHANNELS

(75) Inventors: Dmitri Vdovine, Maple Ridge (CA); Natalia Kremliakova, Vancouver (CA); Andrei Bogdanov, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 875 days.

(21) Appl. No.: 12/635,437

(22) Filed: Dec. 10, 2009

(65) Prior Publication Data

US 2011/0143221 A1    Jun. 16, 2011

(51) Int. Cl.
*H01M 8/00*    (2006.01)

(52) U.S. Cl.
USPC ............ 429/400; 429/535; 427/115; 148/243

(58) Field of Classification Search
USPC .................... 429/34, 482, 483, 494, 400–535
See application file for complete search history.

(56) References Cited

U.S. PATENT DOCUMENTS

| | | | |
|---|---|---|---|
| 6,660,424 B1 | 12/2003 | Gyoten et al. | |
| 2004/0025444 A1* | 2/2004 | Small et al. | 51/307 |
| 2005/0037212 A1* | 2/2005 | Budinski | 428/457 |
| 2006/0040148 A1 | 2/2006 | Blunk et al. | |
| 2006/0286429 A1* | 12/2006 | Shiepe et al. | 429/38 |
| 2007/0020503 A1 | 1/2007 | Hammerschmidt | |
| 2007/0254204 A1 | 11/2007 | Shin et al. | |
| 2007/0298267 A1 | 12/2007 | Zhong et al. | |
| 2009/0238989 A1 | 9/2009 | Dadheech et al. | |
| 2009/0286132 A1 | 11/2009 | Blunk et al. | |
| 2010/0129697 A1 | 5/2010 | Jeon et al. | |

FOREIGN PATENT DOCUMENTS

| | | |
|---|---|---|
| DE | 102009020223 A1 | 11/2009 |
| EP | 1117142 A1 | 7/2001 |
| EP | 1850413 A1 | 10/2007 |
| JP | 2008-112721 A | 5/2008 |
| WO | WO 2004/107485 A2 | 12/2004 |
| WO | WO 2008/130078 A1 | 10/2008 |

OTHER PUBLICATIONS

A. Theodorakakos, et al., "Dynamics of water droplets detached from porous surfaces of relevance to PEM fuel cells", Apr. 7, 2006, pp. 816-887, Journal of Colloid and Interface Science.

(Continued)

*Primary Examiner* — Basia Ridley
*Assistant Examiner* — Caitlin Wilmont
(74) *Attorney, Agent, or Firm* — Patent Central LLC; Stephan A. Pendorf (57) ABSTRACT

A method of surface treating a separator plate of a fuel cell comprises reacting the separator plate with an aqueous solution of hydrogen peroxide. The aqueous solution of hydrogen peroxide comprises one or more salts of one or more transition metals. The one or more transition metals have variable oxidation states. This method makes the surface of the separator plate hydrophilic (~35 deg contact angle of water) and improves its electrical conductivity. The method of surface treating a separator plate (e.g., a graphite and/or graphite composite plate) of a fuel cell can further comprise a method of modifying wettability of the separator plate comprising treating the separator plate with a solution comprising one or more silanes. In another embodiment, a method of modifying wettability of a separator plate (e.g., a stainless steel separator plate) of a fuel cell comprises treating the separator plate with a solution comprising one or more silanes without a surface treating step prior to treating the separator plate with the solution comprising one or more silanes.

21 Claims, 7 Drawing Sheets

(56) References Cited

OTHER PUBLICATIONS

Dusan Spernjak, et al., "Experimental investigation of liquid water formation and transport in a transparent single-serpentine Pem fuel cell", Apr. 3, 2007, Journal of Power Sources, vol. 170 (eleven (11) pp.).

PCT Search Report dated Apr. 5, 2011.

PCT International Search Report dated Jul. 27, 2011.

* cited by examiner

METHOD OF CHEMICAL TREATMENT OF FUEL CELL PLATE SURFACE TO MODIFY WETTABILITY OF FLOW FIELD CHANNELS

BACKGROUND

The presence of liquid water in fuel cells is unavoidable because of water generated during fuel cell operation. In addition, water is brought into the fuel cell by humidified gases. Water is needed for proper humidification of the proton exchange membrane. At the same time, excessive water accumulation in the flow field channels on either anode or cathode sides of the fuel cell can cause numerous problems including reduced fuel cell performance and reliability due to uneven reactant distribution and local reactant starvation in the fuel cell; increased gas flow resistance in some channels diverting the flow to other channels (within cell flow sharing); increased gas flow resistance of particular cells in the stack diverting the flow to other cells (cell to cell flow sharing); increased overall fuel cell stack flow resistance exerting parasitic load on the system components, such as air blower/compressor; and reduced reactants efficiency and economy. These phenomena dictate the need for improved water management.

Increased wettability (hydrophilicity) of the flow field channels helps to spread water droplets and thus prevents channel blockage, and promotes water removal via the film flow along the channel walls and via capillary mechanisms. Flow field channels with extremely hydrophobic surfaces may require less time to remove water because water droplets are very unstable on such surfaces. What is needed is improved water management in the fuel cell.

Moreover, the surface electrical conductivity significantly contributes to the total intrinsic electrical conductivity of carbon-based materials. Thus, improvement of the surface electrical conductivity of composite and graphite separator plates could increase the overall fuel cell stack electrical conductivity.

SUMMARY

The presently disclosed method improves water management in fuel cells by reducing water blockages in the flow field channels, which results in improved performance of the fuel cell and reduced parasitic load on the fuel cell system components. Moreover, the method improves the surface electrical conductivity of carbon based separator plates thereby decreasing contact resistance and ohmic losses through a fuel cell stack.

Provided is a method of surface treating a separator plate of a fuel cell comprising reacting the separator plate with an aqueous solution of hydrogen peroxide. The aqueous solution of hydrogen peroxide comprises one or more salts of one or more transition metals. The one or more transition metals have variable oxidation states. The resulting surface of the separator plate is generally of increased wettability, e.g., about 18-35° contact angle of water when the separator plate surface is graphite, carbon composite or stainless steel. As well, the process can remove resin from the plate surface thus reducing electrical contact resistance of the plate.

The method of surface treating a separator plate (e.g., a graphite and/or graphite composite plate) of a fuel cell can further comprise modifying the wettability of the separator plate by treating the separator plate with a solution comprising one or more silanes. Hydrophobicity of the separator plate is increased when the one or more silanes comprise one or more hydrophobic silanes, while hydrophilicity of the separator plate is increased when the one or more silanes comprise one or more hydrophilic silanes.

In another embodiment, the wettability of a separator plate (e.g., a stainless steel separator plate) of a fuel cell is modified by treating the separator plate with a solution comprising one or more silanes. This modification can occur without a prior surface treating step. The wettability is modified by treating the separator plate with the solution comprising one or more silanes.

DETAILED DESCRIPTION

Standard fuel cell plates can be treated and the surface properties characterized by measuring the contact angle of water and the surface energy. To confirm no channel dimension changes, the flow field channel cross-sectional dimensions can be compared to the channel cross-sectional dimensions of a baseline plate. Plates with a modified surface can be functionally tested in a single cell set-up, which allows the operational friction factor and pressure drop of the reactant gases flow to be measured. The friction factor and the pressure drop data can be obtained and compared with data for the baseline plate.

As opposed to baseline plates, plates with a modified surface (e.g., increased wettability) have a significant decrease in the pressure drop and the friction factor of the gas flow on both anode and cathode sides of the fuel cell. Fuel cell plates with increased surface wettability can exhibit significant reduction in pressure drop and flow resistance (i.e., improved water management), in comparison to a baseline fuel cell with regular plates. When hydroxylating, excessive resin from the plate surface can be removed thereby also reducing electrical contact resistance of the plate.

Hydroxylation

Hydroxylating the surface of a separator plate can increase wettability of a fuel cell plate including the separator plate. Particular advantages of hydroxylating the surface of a separator plate have been found with separator plates having graphite and/or graphite composite material surfaces. In order to impart hydrophilicity to graphite/graphite composite fuel cell plates, the fuel cell plates are exposed to chemical processing to create a well-developed surface of the substrate (S) activated with as many functional hydroxyl groups —OH as possible. Optionally, prior to chemical treatment, the plate can be exposed to mechanical processing (e.g., sonicated) to create a more developed surface. In particular, the plate can be subjected to ultrasonic cleaning, for example, in an appropriate solvent, such as acetone or water, prior to chemical treatment to help create a well-developed surface of the substrate (S) activated with as many functional hydroxyl groups —OH as possible. Ultrasonic cleaning can be performed according to methods readily known to those of skill in the art.

The hydroxylation of the surface can be accomplished by treating the substrate in an aqueous solution of hydrogen peroxide comprising one or more salts of one or more transition metals with variable oxidation states. The one or more transition metals (e.g., Fe, Co, Ni, Cu, and/or Ce) have variable oxidation states. For example, common variable oxidation states of Fe include $Fe^{2+}$ and $Fe^{3+}$.

$$Fe^{2+} + H_2O_2 \rightarrow Fe^{3+} + OH. + OH^- \quad (1)$$

$$Fe^{3+} + H_2O_2 \rightarrow Fe^{2+} + OOH. + H^+ \quad (2)$$

The generated hydroxyl radicals then engage in a secondary reaction with substrate surface carbon and a resin component, thereby hydroxylating the substrate surface. This method also increases hydrophilicity of the metallic plate.

In particular, the plates can be treated with Fenton's Reagent (e.g., 5-30% $H_2O_2$ containing 10-50 ppm $Fe^{2+}$). This treatment can be done at room temperature or at elevated temperatures (e.g., up to 80-90° C.). In general, the separator plate is reacted with the Fenton's Reagent at a temperature between room temperature and 90° C. for reaction period between 48 hours and 1 hour, e.g., 24-48 hours at room temperature, using a mixture of 15-30% hydrogen peroxide and 10-15 ppm $Fe^{2+}$. The treatment generally results in a decrease in the through plate voltage by 25-50%. The method can further include washing the separator plate to remove metal traces from the separator plate and drying the separator plate.

The method is nondestructive. The treatment in Fenton's Reagent solution does not destroy the plates and does not change the morphology of the plates. The treatment is quite stable. The treatment in Fenton's Reagent does not result in any material loss from the surface of the material samples. The process can be used at different temperatures (including room temperature).

Following surface treatment, a contact angle of water on the separator plate can be, for example, 18-35°. Separator plate surfaces with gradients of wettability properties can be created by varying exposure time of different parts of the separator plate to the solution of hydrogen peroxide.

The treatment of the surface with hydrogen peroxide, and in particular Fenton's Reagent, can also be used to improve the surface conductivity of carbon based separator plates. The more aggressive treatment regimes generally involve Fenton's Reagent of at least 15% $H_2O_2$/50 ppm $Fe^{+2}$ with contact at a temperature of at least 80° C., preferably for at least 1 hour. Contact with 30% $H_2O_2$/50 ppm $Fe^{+2}$ at temperature of from 85-90° C., for at least 2 hours, has given even better results. Such a treatment, without silanization, can decrease through plate voltage (TPV) by 25-50%. Such a TPV drop can be quite important, as it helps to increase the performance of a fuel cell stack significantly.

While the presently disclosed method has been described with respect to a method of surface treating a separator plate of a fuel cell, the method can generically be applied to metallic plates coated with a thin layer of carbon. Thus, the method can also be applied to activate carbon for ink preparation in catalyst-coated membrane and gas diffusion electrode manufacturing.

Silanization

Hydroxylation of the surface can be followed by application of a thin layer of hydrophobic or hydrophilic silanes. Resultant wettability of the surface is determined by the type of silane used. Hydroxylation (i.e., surface activation) as described above can improve bonding of the silanes to the substrates.

In particular, the wettability of the separator plate can be modified by treating the separator plate with a solution comprising one or more silanes. This treatment can occur either following a hydroxylation treatment or as a single or initial treatment. Hydrophobicity of the separator plate is increased when the one or more silanes comprise one or more hydrophobic silanes, while hydrophilicity of the separator plate is increased when the one or more silanes comprise one or more hydrophilic silanes. The silane treatment can occur using a solution of the silane, for example, the solution can comprise an alcohol solution. Examples of suitable silanes include, but are not limited to, hydrophobic silanes such as alkoxysilanes and/or fluorocarbon alkoxysilanes, and hydrophilic silanes, which can be alkoxysilanes with hydrophilic functional groups.

In particular, a process of surface silanization by means of alkoxysilanes and fluorosilanes changes the wettability properties of the fuel cell plate. The baseline surfaces and the treated surfaces can be characterized by measuring the contact angle of water on the surface. For example, at room temperature, the range of contact angle of water can be 30-130°, depending on the type of silane applied. Flow field channels with extremely hydrophobic surfaces may require less time to remove water because water droplets are very unstable on such surfaces.

In order to impart either hydrophilic or hydrophobic properties to graphite/composite fuel cell plates, the fuel cell plates can be exposed to chemical processing with silanization by hydrophilic or hydrophobic alkoxysilanes (see G. Berger, The structure of montmorillonite: Preliminary communication on the ability of clays and clay minerals to be methylated, Chem. Weekblad 38 (1941), pp. 42-43). The principle of silanization is based on the following reaction:

wherein
$R_1$ is $CH_3$—, $C_2H_5$—, $C_3H_7$-radicals;
$R_2$ is alkyl or fluoroalkyl radical (hydrophobic), or sulfo-$(C_6H_4SO_3H)$ or amino-$((CH_2)_3$—$NH(CH_2)_2NH_2)$ (hydrophilic) functionalized radicals; and
S is a substrate: graphite, composite component or stainless steel. As a result of the reaction, the substrate surface gains hydrophilic or hydrophobic properties. Optionally, prior to silanization, the plate can be exposed to mechanical processing (e.g., sonicated) in order to improve bonding of the silanes to the plate. In particular, the plate can be subjected to ultrasonic cleaning, for example, in acetone or water, prior to silanization. Ultrasonic cleaning can be performed according to methods readily known to those of skill in the art.

A contact angle of water on the separator plate with increased hydrophobicity can be, for example, 105-120°, while a contact angle of water on the separator plate with increased hydrophilicity can be, for example, 18-35°. Separator plate surfaces with gradients of wettability properties can be created by applying one or more silanes used on different parts of the separator plate.

In the case of a stainless steel separator plate, neither hydroxylation nor acid treatment is needed prior to silanization because silanes create a strong chemical bond with the oxide layer on the surface of the stainless steel. The resultant degree of wettability (i.e., hydrophobicity or hydrophilicity) following silanization is determined by the type of silane.

The following illustrative examples are intended to be non-limiting.

EXAMPLES

Surface Wettability

Three types of substrates were subjected to surface wettability modification: stainless steel with an oxide coating; graphite; and graphite composite. The following commercially available products were tested on all three substrates: Dow Corning Z6020 product (hydrophilic silane); Dow Corning Z6137 product (hydrophilic silane); Dow Corning Z6070 product (hydrophobic silane); Dow Corning Z6689 product (hydrophobic silane); Dow Corning Z6341 product (hydrophobic silane); and 3M EGC-1700 product (hydrophobic coating based on fluorosilane). Results are presented in Table 1.

wettability of the fuel cell operation. Z6137 (hydrophilic silane) and Z6689 (hydrophobic silane) were selected for further surface treatment experiments as they provided the most stable surface properties.

Additionally, the following methods of surface activation were tested in order to improve bonding of the silanes to the substrates: ultrasonic cleaning in acetone prior to the main activation treatment and various main activation treatment methods (i.e., exposure to concentrated nitric acid; concentrated sulphuric acid; hydrogen peroxide (30%); and Fenton's Reagent (10 to 50 ppm $Fe^{2+}$; 5%, 10, 15%, or 30% hydrogen peroxide)) at different temperatures (room temperature to 90° C.) and exposure times.

The hot water exposure test is a standard test used to estimate the lifetime and reliability of fuel cell materials. Typically, materials are exposed to hot water at 80-95° C. for a specified time and material properties are measured at specified time intervals. For the purpose of the surface modification work, the baseline substrate samples and treated samples were exposed to hot water at 85° C. and the contact angle of water was measured after 30 to 80 hours to confirm surface properties.

The hot water exposure test demonstrated sufficient durability of the surface modification for the functional test of the fuel cell plates. The hot water exposure test estimated the

TABLE 1

Silane Application on Stainless Steel, Contact Angle of Water at Room Temperature (°)

|  | Control Samples, Not Silanized | Z 6020 | Z 6137 | Z 6070 | Z 6689 | Z 6341 | EGC-1700 |
|---|---|---|---|---|---|---|---|
| Original substrate | 79 | 79 | 79 | 79 | 79 | 79 | 79 |
| Silane Applied |  | 52 | 33 | 48 | 98 | 66 | 110 |
| After 18 hours in hot water | 67 | 53 | 37 | 50 | 98 | 91 | 95 |
| After 84 hours in hot water | 71 | 60 | 50 | 67 | 96 | 95 | 90 |

Figure 1:
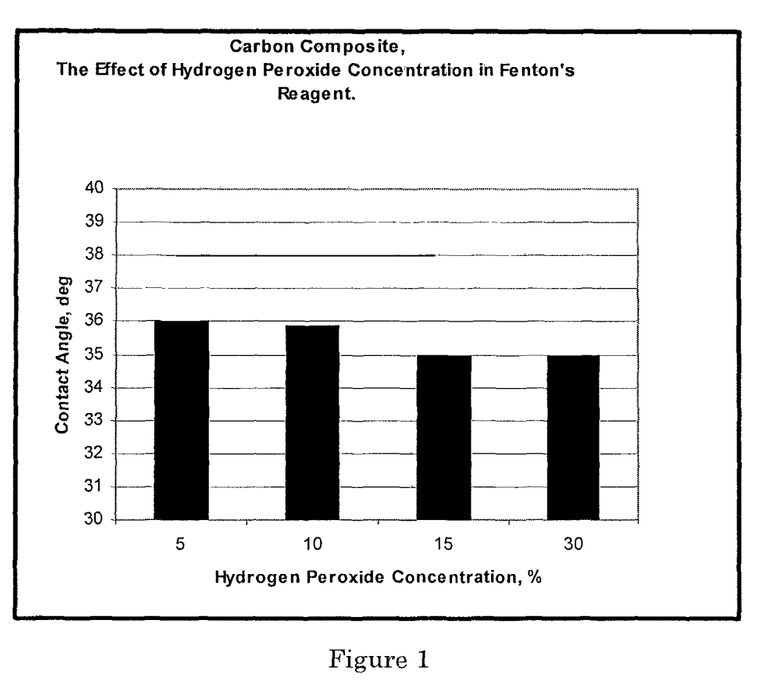
FIG. 1 is a graph of effect of hydrogen peroxide concentration in Fenton's Reagent on the contact angle on a carbon composite substrate in accordance with the present Examples.

It was desired to determine the products (hydrophilic and hydrophobic) that give maximum effect compared to a non-treated substrate (baseline state) and can last for approximately 30-100 hours, which is the time required to perform functional tests on fuel cells to determine the effect of surface durability of the surface modification in a fuel cell environment. The treated surfaces retained their properties for at least 80 hours, which is sufficient time for the functional test of the fuel cell plates. Results are presented in Tables 2-6 and FIG. 1.

TABLE 2

Silane Application on Graphite, Contact Angle of Water at Room Temperature (°); Boiling in Conc. Nitric Acid as Pre-treatment

|  | Control Samples, Not Silanized | Z 6020 | Z 6137 | Z 6070 | Z 6689 | Z 6341 |
|---|---|---|---|---|---|---|
| Original Sample | 85 | 85 | 85 | 85 | 85 | 85 |
| After Pre-treatment | 45 | 45 | 45 | 45 | 45 | 45 |
| Silane Applied |  | 56 | 30 | 93 | 129 | 109 |
| After 18 hours in hot water |  | 56 | 21 | 76 | 104 | 110 |
| After 84 hours in hot water |  | 55 | 29 | 67 | 98 | 106 |

TABLE 3

Silane Application on Graphite, Contact Angle of Water at Room Temperature (°); Boiling in Conc. Sulphuric Acid as Pre-treatment

|  | Control Samples, Not Silanized | Z 6137 | Z 6689 |
|---|---|---|---|
| Original Sample | 85 | 85 | 85 |
| After Pre-treatment | 37 | 37 | 37 |
| Silane Applied |  | 42 | 121 |
| After 30 hours in hot water |  | 67 | 110 |

TABLE 4

Silane Application on Graphite, Contact Angle of Water at Room Temperature (°); Hydrogen Peroxide (30%) as Pre-treatment

|  | Control Samples, Not Silanized | Z 6137 | Z 6689 |
|---|---|---|---|
| Original Sample | 85 | 85 | 85 |
| After Pre-treatment | 64 | 64 | 64 |
| Silane Applied |  | 48 | 118 |
| After 30 hours in hot water |  | 52 | 95 |

TABLE 5

Silane Application on Graphite, Contact Angle of Water at Room Temperature (°); Fenton's Reagent (30% $H_2O_2$) as Pre-treatment

|  | Control Samples, Not Silanized | Z 6137 | Z 6689 |
|---|---|---|---|
| Original Sample | 85 | 85 | 85 |
| After Pre-treatment | 31 | 31 | 31 |
| Silane Applied | N/A | 37 | 122 |
| After 30 hours in hot water | 36 | 46 | 95 |

TABLE 6

Silane Application on Carbon Composite, Contact Angle of Water at Room Temperature (°); Fenton's Reagent (10-30% $H_2O_2$) as Pre-treatment

|  | Control Samples, Not Silanized | Z 6137 | Z 6689 |
|---|---|---|---|
| Original Sample | 89 | 89 | 89 |
| After Pre-treatment | 35 | 35 | 35 |
| Silane Applied | N/A | 51 | 129 |
| After 30 hours in hot water | 40 | 56 | 100 |

Previously known methods of treating plates in acidic solutions can be corrosive and destructive, especially for carbon composite materials. Results of comparison tests are presented in Table 7.

TABLE 7

| Treatment | Stainless Steel Plates | Carbon Composite Plates |
|---|---|---|
| Acid Treatment in conc. $H_2SO_4$, conc. $HNO_3$ solution at 20-80° C. | N/A | Total disintegration of plates (Yellow-Brownish Solution) |
| Treatment with 50 ppm [$Fe^{2+}$/$Fe^{3+}$] 30% $H_2O_2$ at 80° C. and room temp. | No visible corrosion | No visible corrosion |

Among the various main activation treatment methods tested, Fenton's Reagent was preferred, as it was non-destructive with respect to the substrates; gave better surface activation results; satisfied safety requirements for further process scale-up in order to treat fuel cell plates; and gave more flexibility to adjust treatment parameters for modification of separator plates.

Further testing results are presented in Tables 8 and 9. Specifically, according to Table 8, the substrates were subjected to ultrasonic cleaning and then exposure to Fenton's Reagent, followed by the hot water exposure test to estimate durability of treatment. According to Table 8, the substrates were subjected to ultrasonic cleaning, exposure to Fenton's Reagent, and then silane application, followed by the hot water exposure test to estimate durability of treatment.

TABLE 8

Wettability of Substrate, Contact Angle of Water at Room Temperature (°)

|  | Stainless Steel | Graphite | Carbon Composite |
|---|---|---|---|
| Non-treated substrates | 79 | 85 | 89 |
| Ultrasonic cleaning in Acetone | 75 | 77 | 77 |
| Fenton's Reagent (30% $H_2O_2$) exposure | 18 | 31 | 35 |
| After Hot Water Exposure (after Fenton's Reagent exposure), 30 hours | N/A | 36 | 40 |

TABLE 9

Wettability of Substrate after Silane Application, Contact Angle of Water at Room Temperature (°)

|  | Stainless Steel Substrate; Z6137 hydrophilic silane | Stainless Steel Substrate; Z6137 hydrophobic silane | Carbon Composite Substrate; Z6137 hydrophilic silane | Carbon Composite Substrate; Z6137 hydrophobic silane |
|---|---|---|---|---|
| Non-treated substrates | 79 | 79 | 89 | 89 |
| Ultrasonic cleaning in Acetone | 75 | 75 | 77 | 77 |
| Fenton's Reagent (30% $H_2O_2$) exposure | 18 | 18 | 35 | 35 |
| Silane Application | 33 | 98 | 51 | 129 |
| After Hot Water Exposure after silane application, 18 hours | 37 | 98 | 56 | 100 |
| After Hot Water Exposure after silane application, 30 hours |  |  | 57 |  |

TABLE 9-continued

Wettability of Substrate after Silane Application, Contact Angle of Water at Room Temperature (°)

| | Stainless Steel Substrate; Z6137 hydrophilic silane | Stainless Steel Substrate; Z6137 hydrophobic silane | Carbon Composite Substrate; Z6137 hydrophilic silane | Carbon Composite Substrate; Z6137 hydrophobic silane |
|---|---|---|---|---|
| After Hot Water Exposure after silane application, 84 hours | 50 | 96 | | |

A non-treated substrate can have a contact angle of water at room temperature of, for example, approximately 79-89°, depending on the composition of the substrate (e.g., stainless steel, graphite, or carbon composite). Treatment to increase the hydrophilicity of the substrate (e.g., hydroxylation and/or silanization) can result in a decreased contact angle of water at room temperature of, for example, approximately 18-35°. In contrast, treatment to increase the hydrophobicity of the substrate (e.g., silanization) can result in an increased contact angle of water at room temperature of, for example, approximately 105-120°.

Automotive carbon composite fuel cell plates were treated in Fenton's Reagent in order to create a hydrophilic surface (35° contact angle of water measured at room temperature). In order to create a hydrophobic surface, Z6689 was applied (129° contact angle of water at room temperature). Fuel cells were built with non-treated and treated plates and were tested at automotive operational conditions (0.1-1.2 A/cm$^2$, real temperature and pressure).

Figure 2:
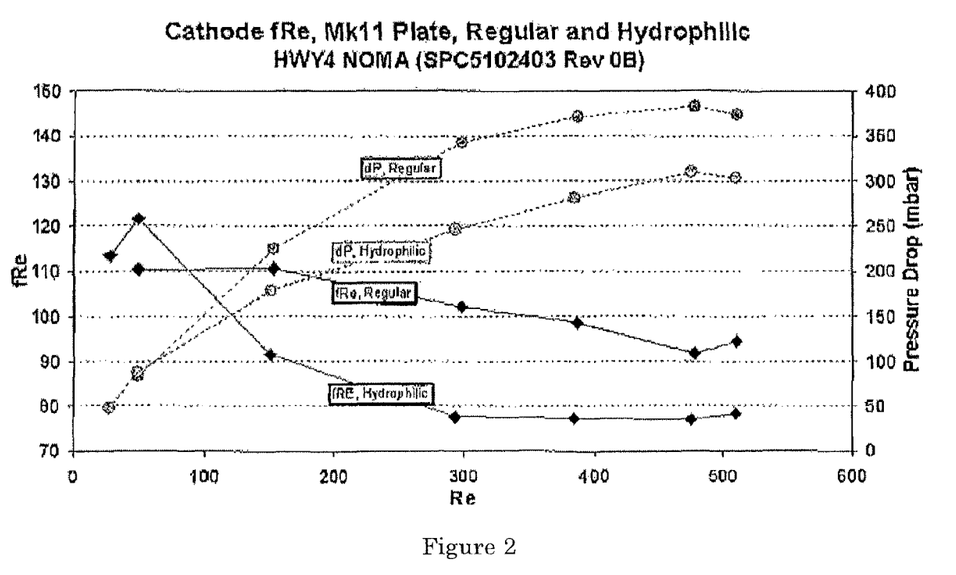
FIG. 2 is a graph of measured pressure drop and calculated friction factor times Reynolds number for plates tested in accordance with the present Examples.

The effect of surface wettability of the plate was estimated by measured pressure drop in the reactant channels and respective calculated friction factor (the parameter used to design the flow field channels) as a function of Reynolds numbers, which correspond to operational flow conditions. Results are presented in FIG. 2, wherein "Regular" refers to a non-treated plate, which would have approximately 85° contact angle at room temperature, and "Hydrophilic" refers to a plate treated in Fenton's Reagent (15-30% $H_2O_2$), which would have approximately 35° contact angle of water.

In summary, the results of the treatments were characterized by measuring the water contact angle and the surface energy of baseline (non-treated) and treated material samples. Treatment resulted in a significant increase in surface wettability of the treated samples, as compared with the baseline. At room temperature, the contact angle of water for the baseline surface was approximately 85°, while for the treated surface it was approximately 30°. The surface energy of the baseline surface was 40-50 mN/m, while the surface energy of the treated surface was approximately 70 mN/m.

Through Plate Voltage—

Figure 3:
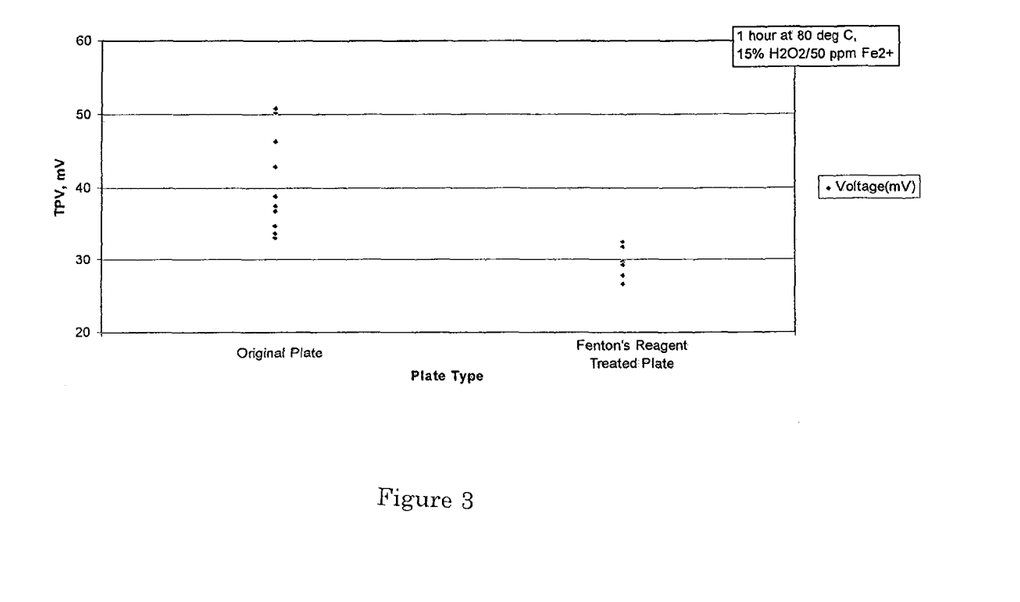
FIG. 3 depicts the TPV of plates treated with a Fenton's Reagent and without a treatment.
Figure 4:
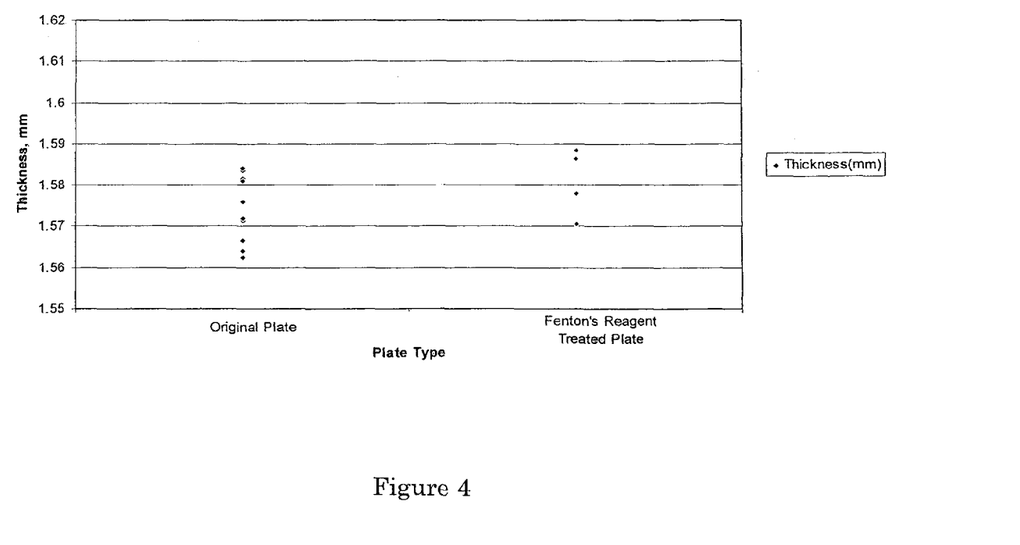
FIG. 4 depicts the thickness of the plates for which the TPV was measured as shown in FIG. 3.

A 110×110×1.5 mm molded blank plate, not bead blasted, was measured in several locations for TPV, then this same plate was treated in Fenton's Reagent and re-measured for TPV. The Fenton's Reagent treatment regime involved 15% $H_2O_2$/50 ppm $Fe^{+2}$, 1 hour at 80° C., DI water washed after treatment, air dried for 12 hours before TPV measurement. TPV and thickness were measured using TUC/RUC fixture, 4 A/2V, 180 psi, 10 sec dwell time, with no CFP in between plate and measurement electrodes. The spread of individual measurements is presented in FIGS. 3 and 4.

Based on the results, it can be concluded that a plate treatment with Fenton's Reagent at 15% $H_2O_2$/50 ppm $Fe^{+2}$, 1 hour at 80° C. reduced contact resistance of the plate (TPV) by ~25% on average.

Figure 5:
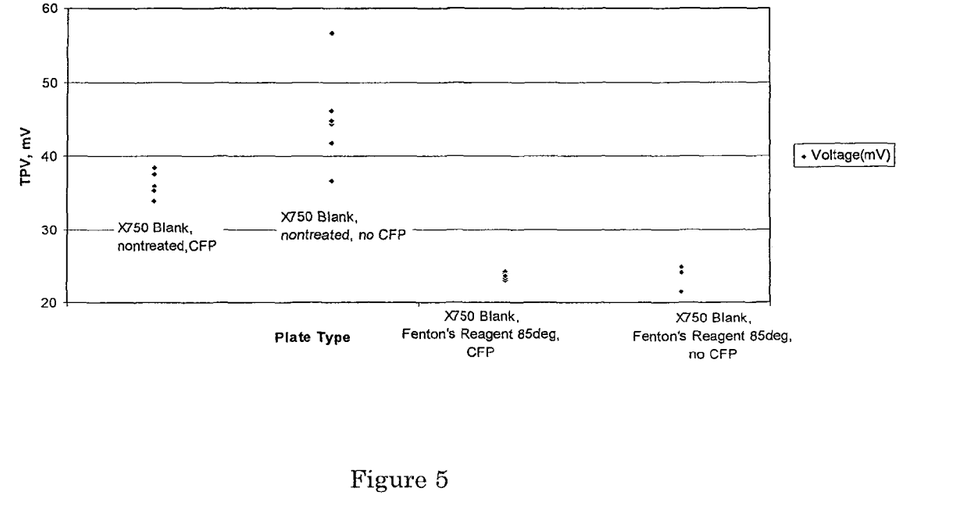
FIG. 5 depicts the TPV of plates treated with a Fenton's Reagent and without a treatment.
Figure 6:
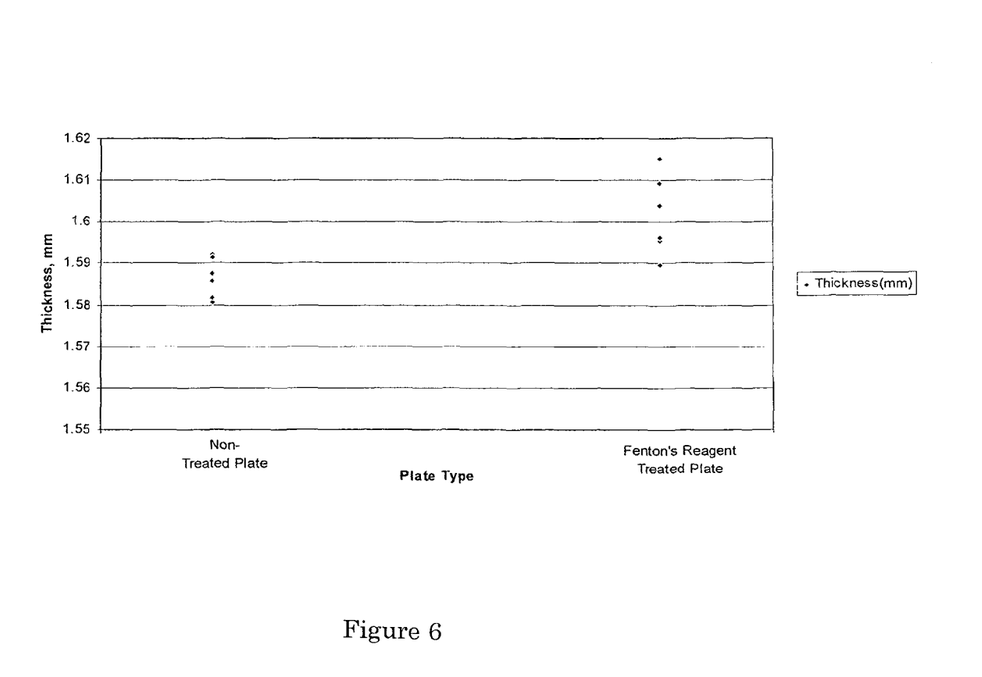
FIG. 6 depicts the thickness of the plates for which the TPV was measured as shown in FIG. 5.

Six 50×50×1.5 mm molded blank plate samples, not bead blasted, were cut and used as baseline and measured in the middle for TPV. Another 6 plate samples were treated in Fenton's Reagent and measured in the middle for TPV. The Fenton's Reagent treatment regime involved 30% $H_2O_2$/50 ppm $Fe^{+2}$, 2 hours at 85-90° C., DI water washed after treatment, air dried for 12 hours before TPV measurement. TPV and thickness were measured using TUC/RUC fixture, 4 A/2V, 180 psi, 10 sec dwell time, with and without CFP in between plate and measurement electrodes. The spread of averages of three consecutive measurements on each plate is shown in FIGS. 5 and 6.

Based on the results, it can be concluded that a plate treatment in Fenton's Reagent at 30% $H_2O_2$/50 ppm $Fe^{+2}$, 2 hours at 85° C. reduces contact resistance of the plate by ~30-50% on average.

Figure 7:
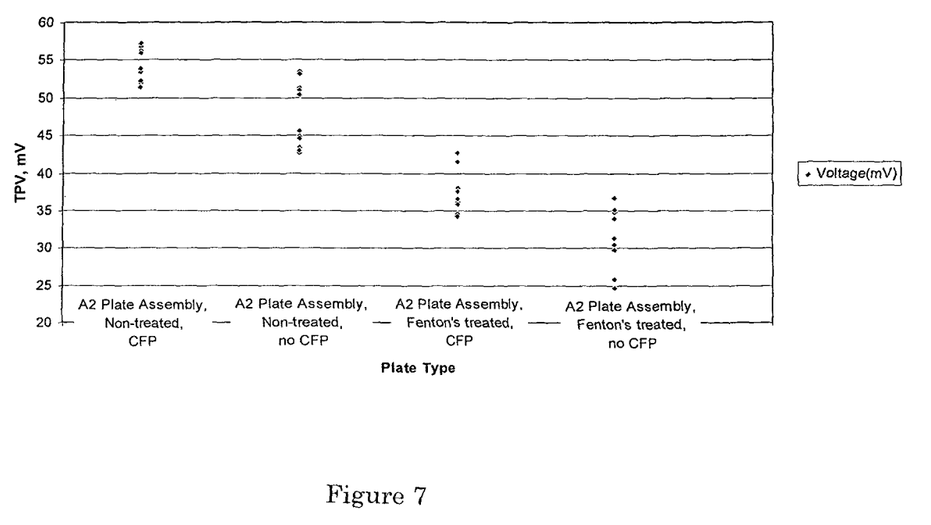
FIG. 7 depicts the TPV of plates treated with a Fenton's Reagent and without a treatment.
Figure 8:
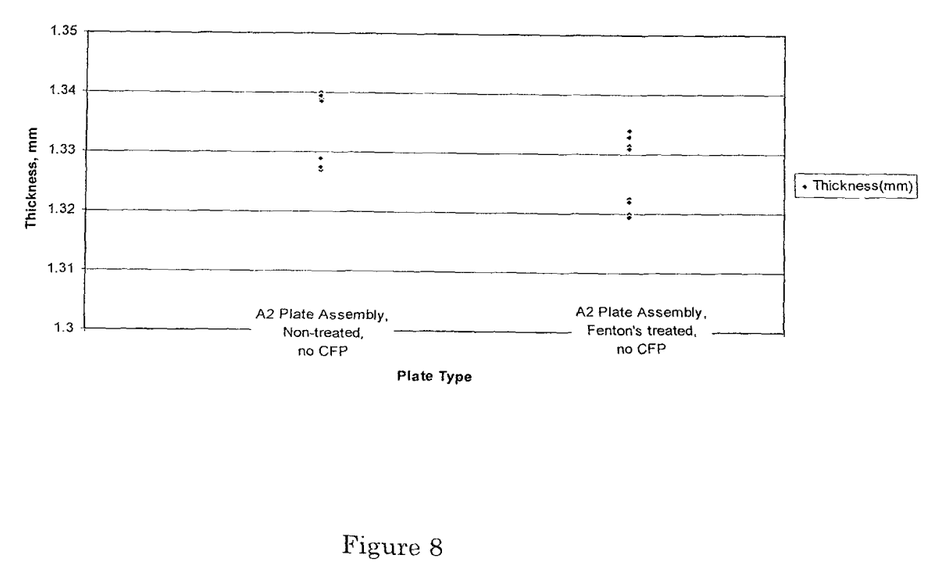
FIG. 8 depicts the thickness of the plates for which the TPV was measured as shown in FIG. 7.

50 mm strips were cut from an A2 molded plate and not bead blasted. 2 plate samples were cut and used as baseline and measured in 2 locations, 3 times in each location, for TPV. Another 2 plate samples were treated in Fenton's Reagent and measured in 2 locations, 3 times in each, for TPV. The Fenton's Reagent treatment regime involved 30% $H_2O_2$/50 ppm $Fe^{+2}$, 2 hours at 85-90° C., DI water washed after treatment, air dried for 12 hours before TPV measurements. TPV and thickness were measured using TUC/RUC fixture, 4 A/2V, 180 psi, 10 sec dwell time, with and without CFP in between plate and measurement electrodes. A spread of all individual measurements is shown in FIGS. 7 and 8.

Based on the results, it can be concluded that a plate treatment in Fenton's Reagent at 30% $H_2O_2$/50 ppm $Fe^{+2}$, 2 hours at 85° C. reduces contact resistance of the plate by ~30-50% on average.

Figure 9:
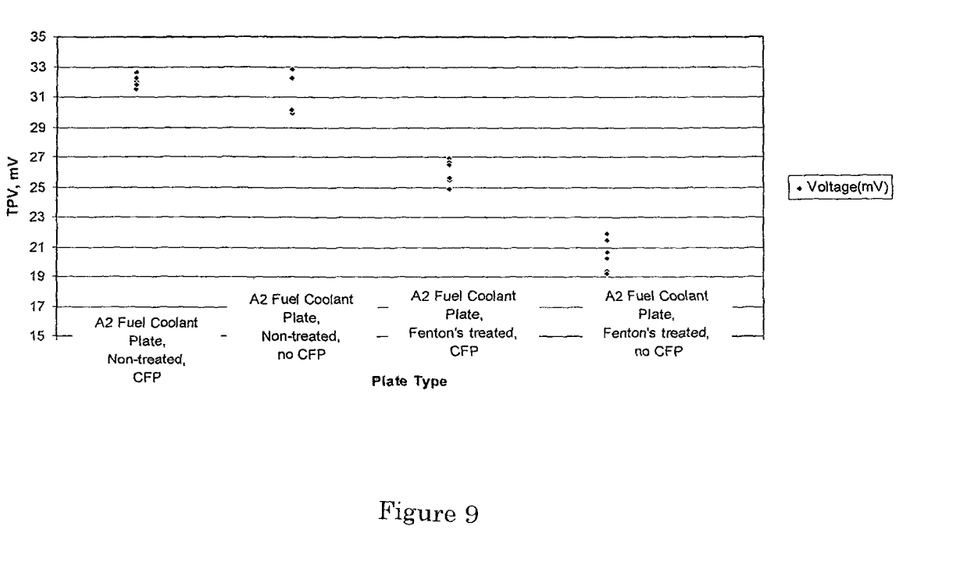
FIG. 9 depicts the TPV of plates treated with a Fenton's Reagent and without a treatment.
Figure 10:
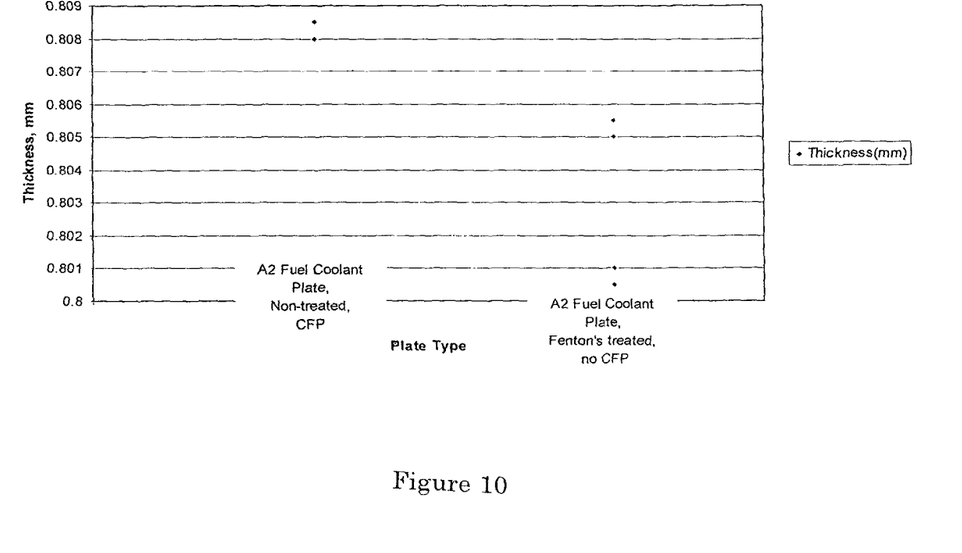
FIG. 10 depicts the thickness of the plates for which the TPV was measured as shown in FIG. 9.

50 mm strips were cut from an A2 molded fuel coolant plate and not bead blasted. 2 plate samples were cut and used as baseline and measured in 2 locations, 3 times in each location, for TPV. Another 2 plate samples were treated in Fenton's Reagent and measured in 2 locations, 3 times in each, for TPV. The Fenton's Reagent treatment regime involved 30% $H_2O_2$/50 ppm $Fe^{+2}$, 2 hours at 85-90° C., DI water washed after treatment, air dried for 12 hours before TPV measurement. TPV and thickness were measured using TUC/RUC fixture, 4 A/2V, 180 psi, 10 sec dwell time, with and without CFP in between plate and measurement electrodes. A spread of all individual measurements is shown in FIGS. 9 and 10.

Based on the results, it can be concluded that a fuel coolant plate treatment in Fenton's Reagent at 30% $H_2O_2$/50 ppm $Fe^{+2}$, 2 hours at 85° C. reduces contact resistance of the plate by ~30% on average.

Figure 11:
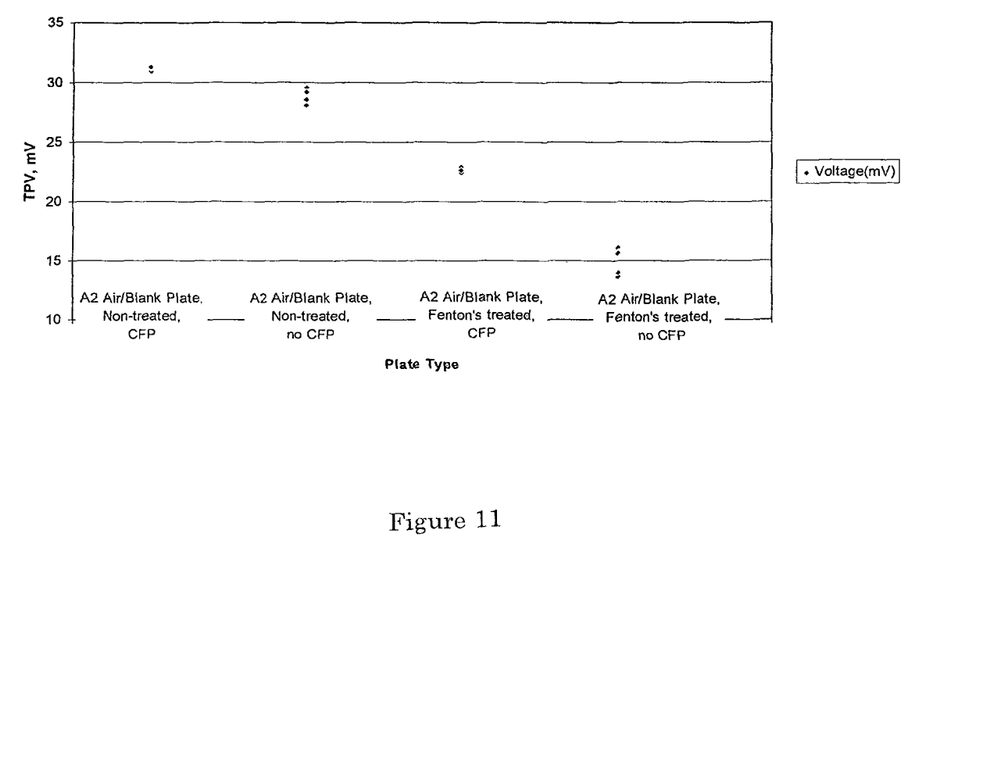
FIG. 11 depicts the TPV of plates treated with a Fenton's Reagent and without a treatment.
Figure 12:
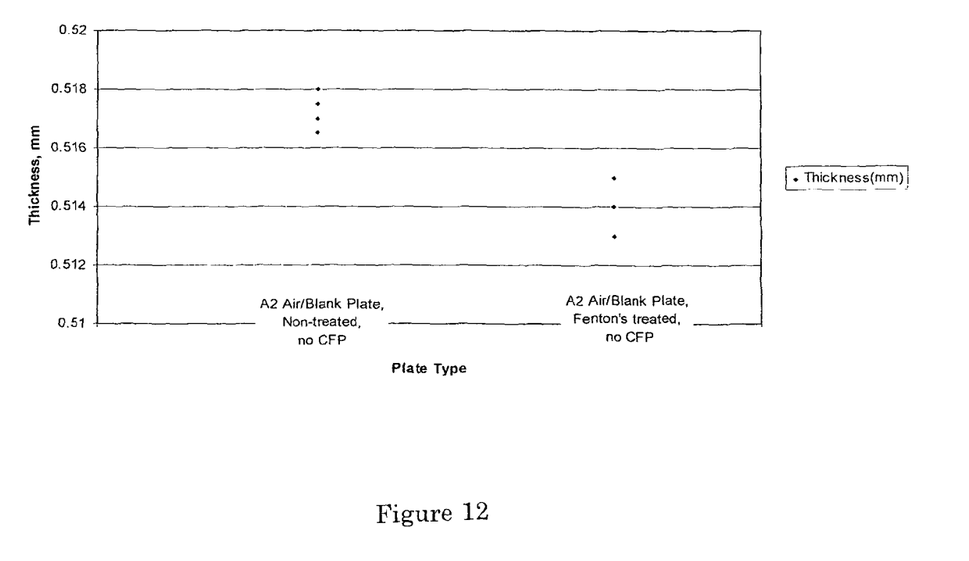
FIG. 12 depicts the thickness of the plates for which the TPV was measured as shown in FIG. 11.

50 mm strips were cut from an A2 molded air blank plate and not bead blasted. 2 plate samples were cut and used as baseline and measured in 2 locations, 3 times in each location, for TPV. Another 2 plate samples were treated in Fenton's Reagent and measured in 2 locations, 3 times in each, for TPV. The Fenton's Reagent treatment regime involved 30% $H_2O_2$/50 ppm $Fe^{+2}$, 2 hours at 85-90° C., DI water washed after treatment, air dried for 12 hours before TPV measurement. TPV and thickness are measured using TUC/RUC fixture, 4 A/2V, 180 psi, 10 sec dwell time, with and without CFP in between plate and measurement electrodes. A spread of all individual measurements is shown in FIGS. 11 and 12.

Based on the results, it can be concluded that an air blank plate treatment in Fenton's Reagent at 30% $H_2O_2$/50 ppm $Fe^{+2}$, 2 hours at 85° C. reduces contact resistance of the plate by ~30% on average.

In general, the foregoing results demonstrate that by using Fenton's Reagent, even without silanization, treatment can make a separator plate hydrophilic and more electrically conductive. The through plate voltage (TPV) can be decreased by 25-50% if a separator plate is treated with Fenton's Reagent at 80-90° C. for 1-2 hours using a mixture of 15-30% $H_2O_2$ and 10-50 ppm $Fe^{+2}$, preferably 50 ppm $Fe^{+2}$. A treatment with Fenton's Reagent can also be used to substitute for a bead blasting process in a separator plate manufacturing process. This could provide a cost reduction for the manufacturing process.

While various embodiments have been described, it is to be understood that variations and modifications may be resorted to as will be apparent to those skilled in the art. Such variations and modifications are to be considered within the purview and scope of the claims appended hereto.

What is claimed is:

1. A method of surface treating a separator plate of a fuel cell comprising:
   reacting the separator plate with a Fenton's Reagent comprising an aqueous solution of hydrogen peroxide and one or more salts of one or more transition metals having variable oxidation states, wherein the separator plate is reacted with the Fenton's Reagent at a temperature between room temperature and 90° C. for a reaction period between 1 hour and 48 hours using a mixture of 15-30% hydrogen peroxide and 10-50 ppm $Fe^{+2}$, to thereby decrease the through plate voltage by 25-50%.

2. The method of claim 1, further comprising modifying wettability of the separator plate by treating the separator plate with a solution comprising one or more silanes.

3. The method of claim 2, wherein modifying wettability of the separator plate comprises increasing hydrophobicity of the separator plate by treating the separator plate with a solution comprising one or more hydrophobic silanes.

4. The method of claim 3, wherein:
   the solution comprises an alcohol solution; and
   the one or more hydrophobic silanes are selected from the group consisting of hydrocarbon alkoxysilanes, fluorocarbon alkoxysilanes, and combinations thereof.

5. The method of claim 2, wherein modifying wettability of the separator plate comprises increasing hydrophilicity of the separator plate by treating the separator plate with a solution comprising one or more hydrophilic silanes.

6. The method of claim 5, wherein:
   the solution comprises an alcohol solution; and
   the one or more hydrophilic silanes comprise alkoxysilanes with hydrophilic functional groups.

7. The method of claim 1, wherein the one or more transition metals are selected from the group consisting of Fe, Co, Ni, Cu, and Ce.

8. The method of claim 1, further comprising:
   achieving a gradient of hydroxylation by varying exposure time of different parts of the separator plate to the solution of hydrogen peroxide.

9. The method of claim 2, further comprising:
   achieving a gradient of hydrophilization of different parts of the separator plate by exposing those parts to the solution comprising one or more different silanes.

10. The method of claim 1, wherein a contact angle of water on the separator plate is 18-35° following the surface treating.

11. The method of claim 3, wherein a contact angle of water on the separator plate is 105-120° following the surface treating.

12. The method of claim 5, wherein a contact angle of water on the separator plate is 18-35° following the surface treating.

13. The method of claim 1, wherein the reaction is carried out using a mixture of about 30% hydrogen peroxide and 50 ppm $Fe^{+2}$.

14. The method of claim 13, wherein the reaction is carried out at room temperature for a reaction period of 24-48 hours.

15. The method of claim 13, wherein the reaction is carried out at a temperature between 80° C. and 90° C. for a reaction period of 1-2 hours.

16. The method of claim 1, wherein the separator plate comprises a material selected from the group consisting of graphite, graphite composite, and combinations thereof.

17. The method of claim 1, wherein the separator plate has one or more flow field channels, the method further comprising surface treating one or more flow field channels of the separator plate.

18. The method of claim 1, further comprising:
   washing the separator plate to remove metal traces from the separator plate; and
   drying the separator plate.

19. The method of claim 1, further comprising ultrasonic cleaning the separator plate prior to reacting the separator plate with the Fenton's Reagent.

20. A separator plate surface treated by reacting the separator plate with a Fenton's Reagent comprising an aqueous solution of hydrogen peroxide and one or more salts of one or more transition metals having variable oxidation states, wherein the separator plate is reacted with the Fenton's Reagent at a temperature between room temperature and 90° C. for a reaction period between 1 hour and 48 hours using a mixture of 15-30% hydrogen peroxide and 10-50 ppm $Fe^{+2}$, to thereby decrease the through plate voltage by 25-50%.

21. A fuel cell comprising a separator plate surface treated by reacting the separator plate with a Fenton's Reagent comprising an aqueous solution of hydrogen peroxide and one or more salts of one or more transition metals having variable oxidation states, wherein the separator plate is reacted with the Fenton's Reagent at a temperature between room temperature and 90° C. for a reaction period between 1 hour and 48 hours using a mixture of 15-30% hydrogen peroxide and 10-50 ppm $Fe^{+2}$, to thereby decrease the through plate voltage by 25-50%.

* * * * *